United States Patent [19]
Stacher

[11] Patent Number: 5,118,026
[45] Date of Patent: Jun. 2, 1992

[54] METHOD FOR MAKING TITANIUM ALUMINIDE METALLIC SANDWICH STRUCTURES

[75] Inventor: George W. Stacher, Westminster, Calif.

[73] Assignee: Rockwell International Corporation, Seal Beach, Calif.

[21] Appl. No.: 680,457

[22] Filed: Apr. 5, 1991

[51] Int. Cl.$^5$ .............................................. B23K 31/02
[52] U.S. Cl. .................................. 228/157; 228/44.3; 228/193; 228/263.21
[58] Field of Search ...................... 228/193, 44.3, 212, 228/263.21, 157, 243

[56] References Cited

U.S. PATENT DOCUMENTS

| | | | |
|---|---|---|---|
| 3,920,175 | 11/1975 | Hamilton et al. | 228/263.21 |
| 3,927,817 | 12/1975 | Hamilton et al. | 228/157 |
| 3,980,220 | 9/1976 | Wolfe et al. | 228/263.21 |
| 4,087,037 | 5/1978 | Schier et al. | 228/157 |
| 4,220,276 | 9/1980 | Weisert et al | 228/157 |
| 4,406,393 | 9/1983 | Ascani, Jr. et al. | 228/157 |
| 4,691,857 | 9/1987 | Friedman | 228/243 |
| 4,811,890 | 3/1989 | Dowing et al. | 228/193 |

Primary Examiner—Richard K. Seidel
Assistant Examiner—Chuck Y. Mah
Attorney, Agent, or Firm—Terrell P. Lewis; Charles T. Silberberg

[57] ABSTRACT

A method for fabricating of intermetallic titanium aluminide sandwich structures in which blanks of titanium aluminide are bonded to one another, under vacuum in a retort, at selected areas to form a pack, and then, upon removal of the retort, expanded superplastically to form a desired sandwich structure. Bonding of the various preselected areas of the metal blanks is accomplished using elevated temperature gas diffusion bonding techniques. The invention contemplates a first thermal cycle during which the pack is diffusion bonded in an evacuated retort at one temperature within a predetermined range of temperatures, and a second thermal cycle during which subsequent superplastic forming of the pack of bonded blanks, with the retort removed, is carried out. Optionally, during the first thermal cycle, a step of superplastic preforming may be carried out whereby the pack is preformed against arcuate or other shaped forming members.

20 Claims, 5 Drawing Sheets

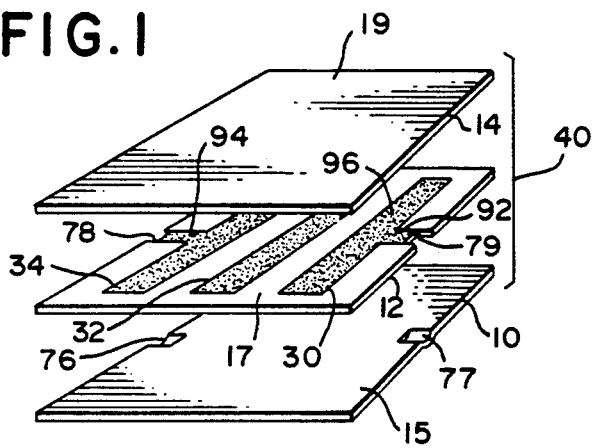
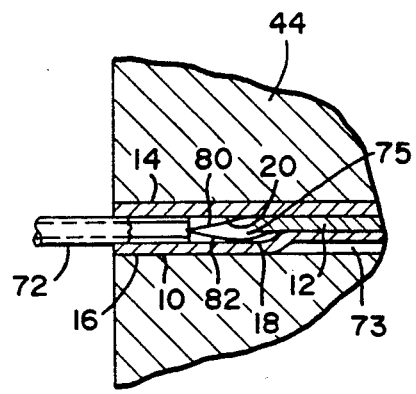
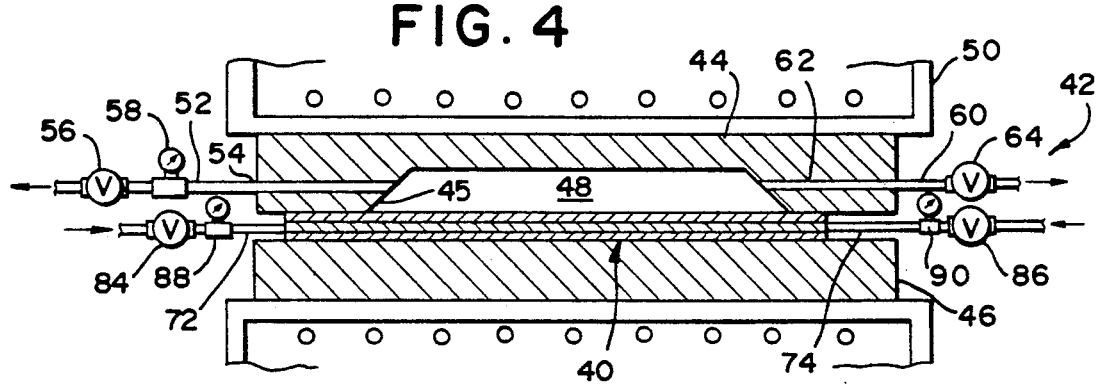
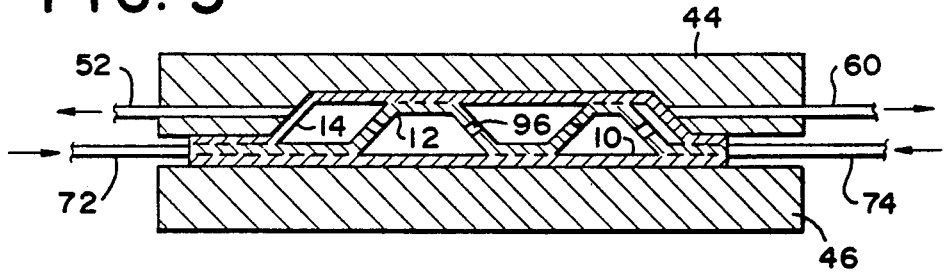
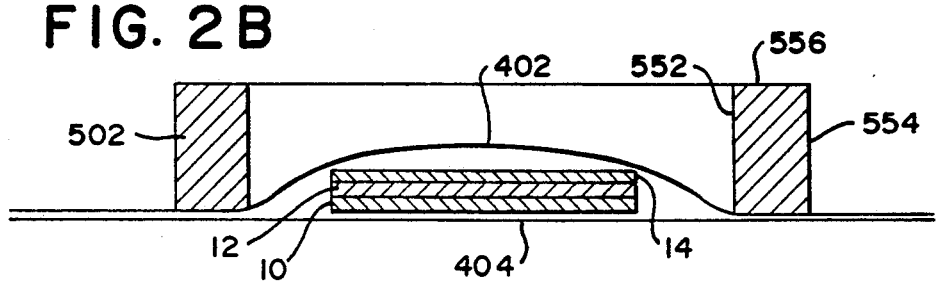

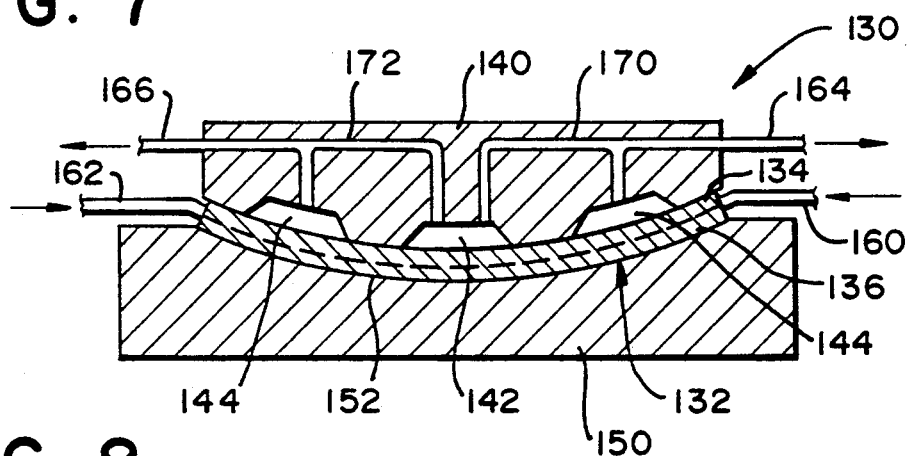
FIG. 7
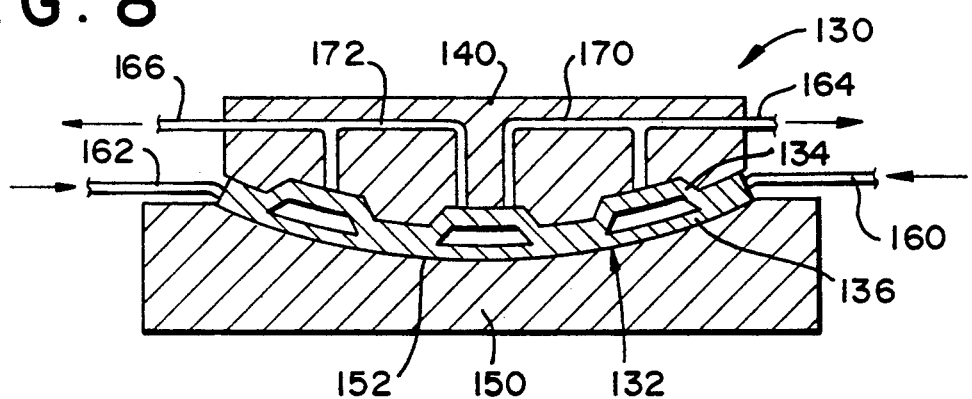
FIG. 8
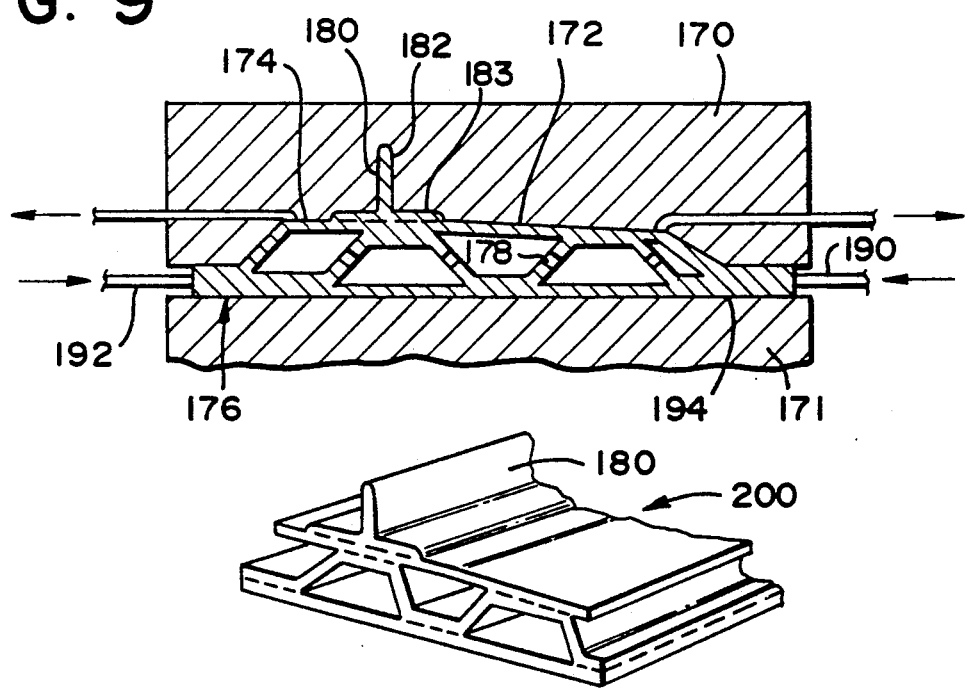
FIG. 9
FIG. 10

METHOD FOR MAKING TITANIUM ALUMINIDE METALLIC SANDWICH STRUCTURES

BACKGROUND OF THE INVENTION

1. Field of the Invention

The present invention relates to processes for fabricating structural units from ordered titanium aluminide base alloys, and more particularly to methods of making metallic sandwich structures from titanium aluminide components by applying stop-off material at appropriate locations and joining sheets of the metal together through a process of diffusion bonding, and then superplastically expanding the bonded sheets to form a sandwich structure of the shape desired.

2. Discussion of the Known Prior Art

In its purest form, titanium is a relatively soft, weak and extremely ductile metal. Through additions of other elements, the base metal can be converted to an engineering material having unique characteristics, such as high strength and stiffness, resistance to corrosion, usable ductility, and low density.

Titanium is capable of existing in two or more crystalline forms. In unalloyed titanium (at up to about 785° C.), the atoms arrange themselves in a hexagonal close-packed crystal array called "alpha phase". When titanium is heated above the transition temperature (beta-transus) of about 785° C., the atoms rearrange into a body-centered cubic structure called "beta phase". The addition of other elements to a titanium base will generally favor one or the other of the alpha or beta phases and will respectively increase or decrease the beta-transus temperature.

Titanium-aluminum base alloys containing about 10 to 50 atomic percent Al and about 80 to 50 atomic percent Ti in addition to other alloying elements have been recognized for some time. These alloys are ordered and divided into two major groups: the alpha-2 alloys based on the intermetallic compound $Ti_3Al$, and the gamma alloys based on the intermetallic compound TiAl. There also exists a class of alloys containing a mixture of the alpha-2 and beta phases. These alloys, which are referred to as "titanium aluminides", exhibit excellent high-temperature strength and oxidation and creep resistance, and for these reasons have found widespread utility in aerospace applications.

However, although a multitude of processes for forming these metals have been attempted, very few have proven successful and consistent because titanium aluminide alloys are relatively brittle and difficult to process and/or fabricate at room or near-room temperatures. Indeed, a major competitor of applicant's assignee recently gave up its pursuit of a solution to this pervasive problem. This leading corporate entity apparently abandoned its research targeted at solving this long-felt problem when, after many years of fruitless effort, it consistently encountered cracking of the titanium aluminide materials during bonding and forming operations.

Some of the techniques which have been attempted for the fabrication of titanium aluminide materials include forging, extrusion, rolling, drawing, casting and powder metallurgy. Recently, superplastic forming (SPF), with or without concurrent diffusion bonding (DB), has achieved a certain prominence. This process has made it possible to form titanium aluminides in a simple manner, with significant reduction in parts such as fasteners, thereby permitting the fabrication of airframe and engine structures with significant cost and weight reduction.

For many years, it has been known that certain metals are "superplastic", i.e., have the capability of developing unusually high tensile elongations with reduced tendency toward necking. This property is exhibited by only a few metals and alloys and only within a limited temperature and strain rate range. Titanium, titanium alloys and, most recently, titanium aluminides, have been observed to exhibit superplastic characteristics equal to or greater than those of any other metals. With suitable titanium alloys, it is possible to attain an overall increase in surface area of over 300%, and recent tests have shown these high elongations to be present in titanium aluminides as well.

The advantages of superplastic forming are numerous. Very complex shapes and deep drawn parts can be readily formed. Low deformation stresses are required to form the metal at the superplastic temperature range, thereby permitting forming of parts under low pressures which minimize tool deformation and wear, allows the use of inexpensive tooling materials, and eliminates creep in the tool. Single male or female tools can be used; no spring-back occurs; no Bauschinger effect develops; multiple parts of different geometry can be made during a single operation; very small radii can be formed; and no problem with compression buckles or galling are encountered.

However, when carrying out the process of superplastic forming using titanium aluminides and similar reactive metals, it is necessary to heat and form the materials in a controlled environment to ensure cleanliness of the titanium which is particularly sensitive to oxygen, nitrogen, and water vapor content in the air at elevated temperatures. Unless the titanium aluminide is protected, it becomes embrittled and its integrity is destroyed.

Diffusion bonding refers to the metallurgical joining of surfaces of similar or dissimilar metals by applying heat and pressure for a time duration so as to cause co-mingling of atoms at the joint interface. Diffusion bonding is accomplished entirely in the solid-state at or above one-half the base metal melting point (absolute). Actual times, temperatures, and pressures will vary from metal to metal. The adjoining surfaces require preparatory cleaning, as for example by hand sanding and wiping or pickling. Surfaces must be brought within atomic distances by application of pressure. Adequate pressure must also be provided to cause some plastic flow to fill normal void areas. If pressures are too low, small voids will remain at the joint interface and the joint strength will be less than the maximum obtainable. The application of pressure also breaks up the surface oxides and surface asperites so as to present clean surfaces for bonding. The elevated temperatures used for diffusion bonding serve to accelerate diffusion of atoms at the joint interfaces as well as to provide a metal softening which aids in surface deformation thereby allowing more intimate contact for atom bonding and movement across the joint interface. The elevated temperature and application of pressure also results in diffusion of the surface contaminants into the base metal during bonding which allows metal atom-to-atom bonding and thereby strengthens the bond. Sufficient time must be allowed to ensure the strengthening of the bond by diffusion of atoms across the joint interface. A protective atmosphere for bonding is required when titanium, titanium alloys and titanium aluminides and other similar reactive metals are to be bonded.

The present invention also addresses problems associated with forming sandwich structures. A sandwich structure normally comprises a core between face sheets. Typically, fabrication of sandwich structures has taken the approach of first rolling metal foil or ribbon, then forming and joining the foil sheet into a desired cellular core configuration, and then attaching the core configuration to face sheets by brazing or spot welding. Problems encountered with the prior art methodology include the high cost of core fabrication due to excess material usage and the great difficulty of forming, excess time consumption, and cost of fabrication of the sandwich shape. Additionally, a separate operation is required to join a close out or attachment to the sandwich structure. Fabrication of an unusual shape for the sandwich structure, such as a taper, is nearly impossible. This is particularly true for the titanium aluminide material where foil is extremely difficult and expensive to produce, joining by welding or brazing has not been firmly established and the overall set-up cost and fabrication expenses have often proven prohibitive.

SUMMARY OF THE INVENTION

It is therefore a primary object of the present invention to provide an improved method for fabrication of titanium aluminide sandwich structures that combines the processes of metal joining and superplastic forming.

Another object of the present invention is to provide a method for forming titanium aluminide multiple hollow sandwich structures using diffusion bonding and superplastic preforming techniques in one continuous operation, thereby significantly lowering the cost, difficulty and time involved, followed by superplastic expansion.

Another object of the invention is to provide a method for forming a metal sandwich structure using titanium aluminide materials in which the resulting structure exhibits no cracking during either the bonding operation or the forming operation.

Still another object of the invention is to provide a two step method for fabricating a titanium aluminide sandwich structure, wherein the first step involves using a retort to bond metal blanks as a pack in a contamination-free environment during a first thermal cycle, and the second step involves removing the retort after cooling of the pack, and then superplastically forming the sandwich interior in a second thermal cycle.

Briefly, in accordance with the invention, there is provided methods for making metallic sandwich structures from a plurality of metal blank workpieces initially positioned in a stacked array. The blanks are joined at selected areas, most preferably by diffusion bonding techniques. At least one of the blanks is superplastically formed against a shaping member to form the desired sandwich structure. The final configuration of the sandwich structure is determined by the location, size, and shape of the joined areas.

BRIEF DESCRIPTION OF THE DRAWINGS

Other objects and advantages of the invention will become apparent upon reading the following detailed description and upon reference to the drawings, in which:

FIG. 1 is an exploded view of a three-piece metal sheet assembly treated for selective diffusion bonding prior to insertion in the bonding apparatus;

FIG. 2B is a cross-sectional view of the retort and pack of metal sheets shown in FIG. 2A taken along section line 2B—2B in FIG. 2A;

FIG. 4 is a cross-sectional elevational view of a preferred embodiment of a forming apparatus used for fabrication of metal sandwich structures with the three-piece bonded metal sheet assembly of FIG. 1 inserted therein;

FIG. 5 illustrates the fully expanded three-piece bonded metal sheet assembly within the forming apparatus of FIG. 4, with the broken lines illustrating the final position of the component metal sheets of the expanded joined assembly;

FIG. 6 is a detail view of an inflation tube connection for the three-piece metal sheet assembly;

FIGS. 7 and 8 are cross-sectional elevational views of a modified forming apparatus with a two-piece bonded metal sheet assembly inserted in an initial position in FIG. 7 and in a final expanded position in FIG. 8;

FIG. 9 is a cross-sectional elevational view of a modified forming apparatus illustrating a tapered three-piece bonded metal sheet assembly in final formed position with an attachment joined to the sandwich structure at the broken lines; and FIG. 10 is a partial perspective view of the formed sandwich structure of FIG. 9.

Figure 2A:
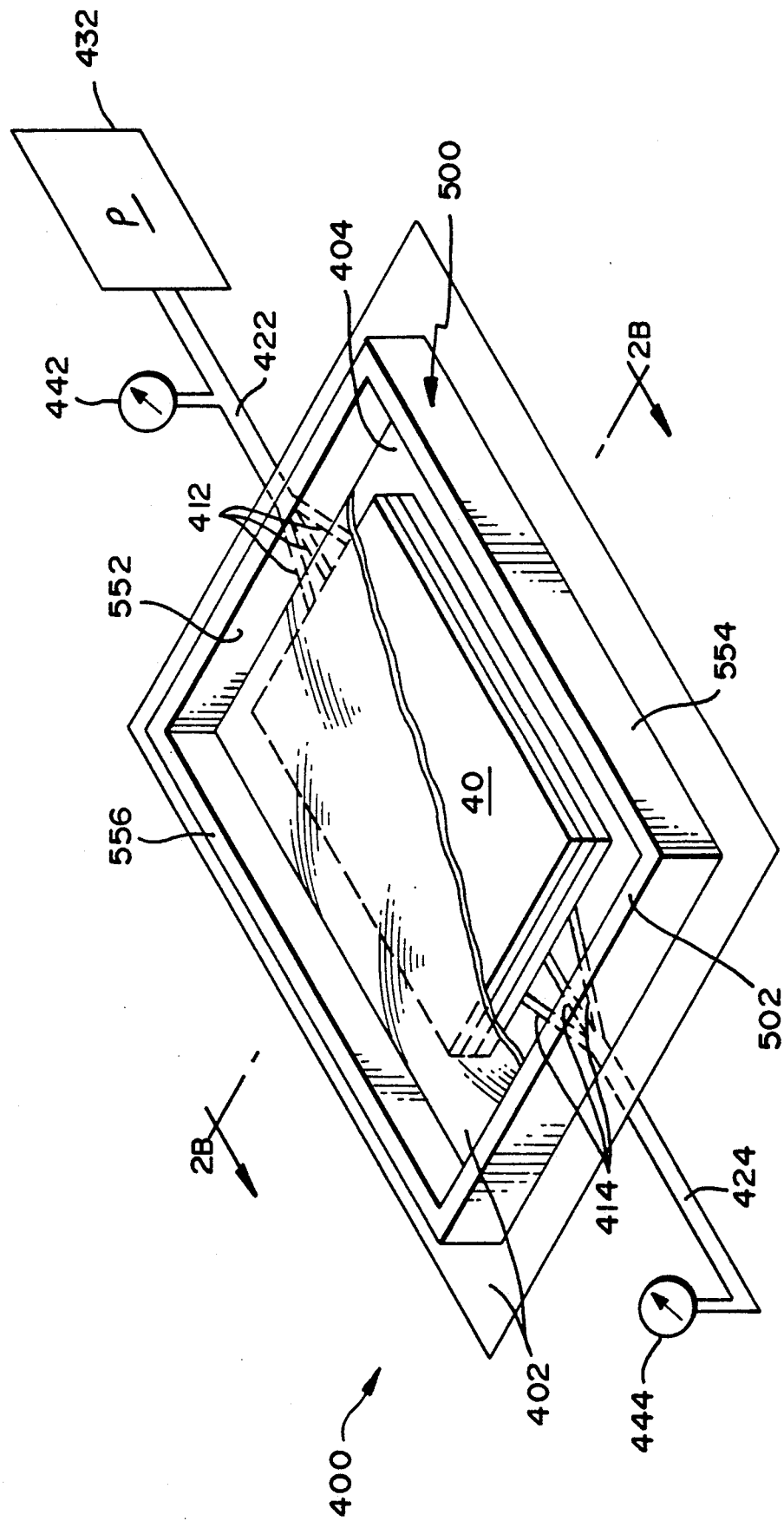
FIG. 2A is a perspective view, with a portion broken away, showing the manner of fabrication of the retort about the pack of metal sheets prior to effecting diffusion bonding.

While the invention will be described in connection with preferred procedures, it is to be understood that the following detailed description is not intended to limit the invention to those procedures. On the contrary, it is intended to cover all alternatives, modifications, and equivalents that may be included within the spirit and scope of the invention.

DETAILED DESCRIPTION OF THE INVENTION

In order for superplastic forming to be successful, it is necessary to use a material that is suitable. The extent to which the material selected will exhibit superplastic properties is predictable in general terms from a determination of the strain rate sensitivity and a design determination of the permissible variation in wall thickness. Strain rate sensitivity can be defined as M, where $$M = \frac{d(\ln s)}{d(\ln e)},$$

S = stress in pounds per square inch, and
e = strain rate in reciprocal minutes.

Strain rate sensitivity may be determined by a simple and now well recognized torsion test described in the article, "Determination of Strain Hardening Characteristics by Torsion Testing", by D.S. Fields, Jr. and W. A. Backofen. published in the Proceedings of the A.S.T.M., 1957, Volume 57, pages 1259-1272. A strain rate sensitivity of about 0.5 or greater can be expected to produce satisfactory results. The larger the value (to a maximum of one), the greater the superplastic properties. Maximum strain rate sensitivity in metals is seen to occur, if at all, as metals are deformed near the phase transformation temperature. Accordingly, the temperature immediately below the phase transformation temperature can be expected to produce the greatest strain rate sensitivity. For titanium aluminide, the temperature range in which superplasticity can be observed is about 1750° F. to about 1900° F.

Other variables have been found to affect strain rate sensitivity and therefore should be considered in selecting a suitable metal material. Decreasing grain size results in correspondingly higher values for strain rate sensitivity. Additionally, strain rate and material texture affect the strain rate sensitivity. It has been found that for titanium aluminide, the m value reaches a peak at an intermediate value of strain rate (approximately $2 \times 10^{-4}$ in./in./sec.). For maximum stable deformation, superplastic forming should be done at or near this strain rate. Too great a variance from the optimum strain rate may result in loss of superplastic properties.

Diffusion bonding, through which separate elements form a single unitary mass, has been practiced in a wide variety of metals and alloys. However, the quality of the bond and the parameters employed necessarily vary for each particular choice of workpiece material.

The present invention is particularly directed to reactive metals which have surfaces that would be contaminated at the elevated temperatures required for superplastic forming and diffusion bonding. Titanium aluminides are examples of such metals which have also been found to be particularly well-suited for the process of the present invention in that these materials exhibit very high superplastic properties in a temperature range suitable for diffusion bonding, i.e., 1750° F. to about 1900° F. depending on the specific alloy used.

Referring now to FIG. 1, there is shown an exploded view of a three-piece metal sheet assembly to be formed into a sandwich structure according to the present invention. The assembly is made up of metal blanks 10, 12, 14 all preferably in the form of sheets having upper and lower opposed principal surfaces 15 and 16, 17 and 18, and 19 and 20, respectively (see also FIG. 4). The number of sheets used will vary depending on load conditions and design requirements. However, a minimum of two sheets must be used. Depending on the number of sheets to be expanded, at least one of the sheets must exhibit superplastic properties. Any metal that exhibits suitable superplastic properties within a workable temperature range can be used for such sheet, but the present invention is particularly concerned with metals that exhibit superplastic properties within the temperature range required for diffusion bonding and that are subject to contamination at forming temperature, such as alpha-2 titanium aluminides. When using alpha-2 titanium aluminides, the forming temperature is preferably approximately 1800° F. The initial thickness of metal blanks 10, 12, 14 is determined as a function of the dimensions of the part to be formed.

In order to join only selected areas of the metal sheets, a preferred step is to apply a suitable stop-off material to those areas within the stack of sheets where no attachment or joining between the sheets is desired. Thus, as shown in FIG. 1, areas 30, 32 and 34 are covered with a stop-off material to prevent bonding in those areas. Other areas on surfaces 15, 18 and 20 could also be so covered for prevention of joining. Alternatively, the metal sheet structure could be spot welded or brazed at those areas where joining is desired. Additionally, as hereinafter explained, the metal sheet structure or stack 40 could be diffusion bonded at selected areas by selective application of pressure.

FIGS. 2A and 2B illustrate a retort or container which has been formed about the stack of metal sheets for the purpose of insuring that when the diffusion bonding technique is carried out at a sufficiently high enough temperature suitable for such a process, such bonding process can be effected in a controlled, oxygen-free and contaminent-free environment.

As shown in FIGS. 2A and 2B, the retort 400 comprises a top sheet 402 of metal, preferably stainless steel, and a bottom sheet 404 of metal, also preferably stainless steel. Preferably, the top and bottom sheets of the retort are secured in a substantially air-tight manner, such as by welding, about their periphery to sealingly envelope the metal sheet structure or stack 40. Vacuum grooves 412 and 414 are formed in the bottom sheet 404 of the retort and are disposed on opposite sides of the metal sheet stack 40. The grooves are positioned such that they extend from a respective stack edge within the retort outwardly to and through an adjacently located sealed edge of the retort. The vacuum grooves are important because they facilitate the creation of a vacuum within the sealed retort and within the stack. In this manner, a contamination-free and oxygen-free environment such as that referred to above can be maintained within the retort during the heat-up phase and the diffusion bonding phase of the process contemplated by the present invention.

To create a vacuum within the sealed retort, a vacuum pump 432, which as shown in FIG. 2A is interconnected with the vacuum grooves 412 via a vacuum line or tube 422, is actuated to apply negative pressure (suction) to the interior of the retort. Pump 432 is operated until the pressure guage 442 shows attainment of a predetermined vacuum level, optimally between $10^{-5}$ Torr and $10^{-6}$ Torr. A second gauge 444 is used to ensure that a vacuum has been attained throughout the retort. This is accomplished by coupling the gauge to the interior of the retort via tube 424 and vacuum grooves 414, and using the gauge to verify a vacuum throughout the entire retort.

A metal seal frame 500 fabricated from stainless steel strips 502 is disposed atop the top sheet 402 of the retort in such a manner as to be spaced from, yet parallel to, the edges of the metal stack 40. The seal frame 500 is attached to the top sheet 402 of the retort 400 (note FIG. 2B) and each strip 502 includes an inner side 552, an outer side 554 and a top surface 556. The purpose of the seal frame 500 will be described below in connection with the apparatus used to achieve diffusion bonding of the stack 40 of metal sheets.

While the size of the seal frame 500 depicted in the Figures is not accurately portrayed, it is intended to be a true representation of the manner of construction of the retort. In actual practice, it has been found that the most advantageous height of the seal frame strips 502 is preferably on the order of between ¼" and ½".

Figure 3A:
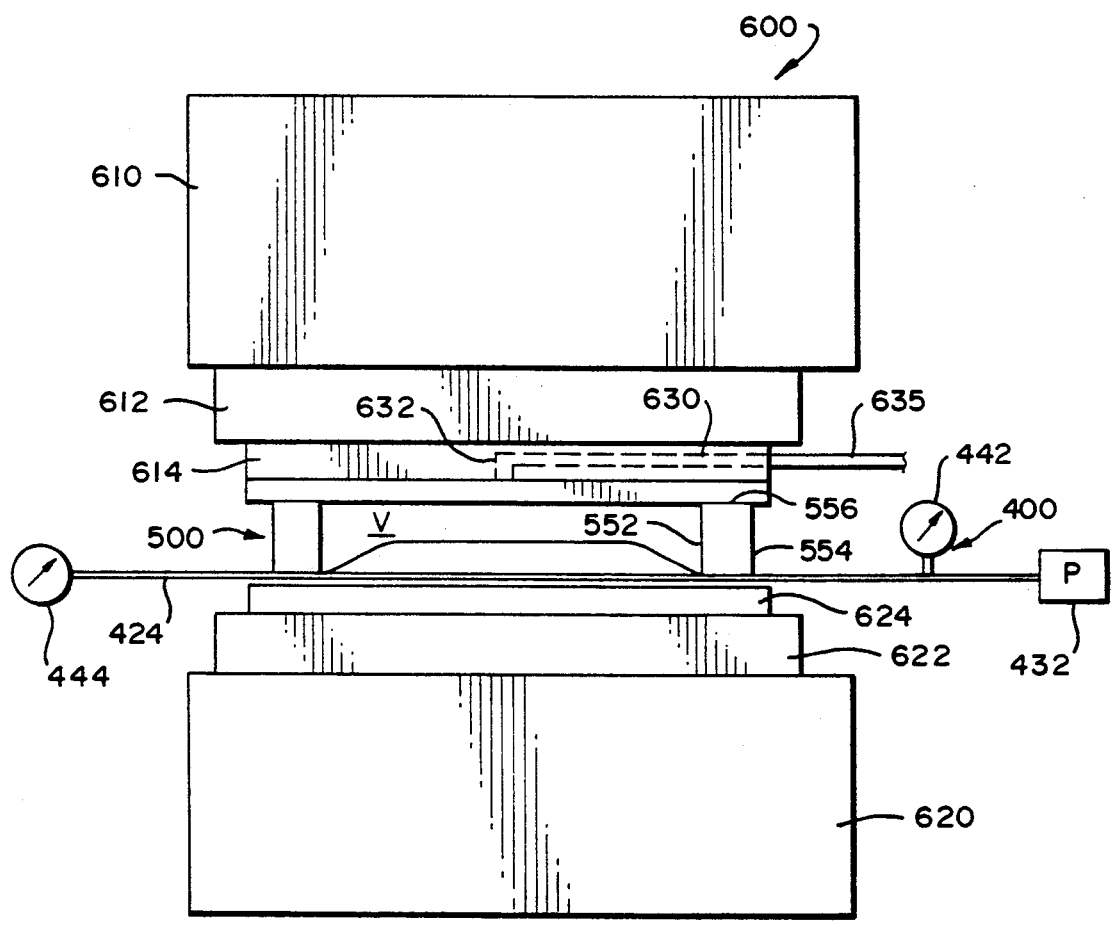
FIG. 3A is a cross-sectional view of one tool assembly used to effect diffusion bonding as contemplated by the present invention, with the sealed retort being disposed between upper and lower press assembly tools in advance of effecting the step of diffusion bonding.

Referring now to FIG. 3A, there is shown one apparatus 600 by which the process of diffusion bonding of the stack 40 of metal sheets may be accomplished. The apparatus includes an upper press member 610 and a lower press member 620. Mounted on the exposed face of the upper press member is a platen member 612, and an upper tool 614 is mounted on the exposed face of the upper platen member. Likewise, a lower platen member 622 is mounted on the exposed face of the lower press member 620, and a lower tool 624 is mounted on the exposed face of the lower platen member. The upper and lower platens are fabricated from ceramic materials. Preferably, the upper and lower tools are made from metals which possess excellent heat transfer characteristics. A horizontally extending gas transfer passage 630 is provided in the upper tool 614 running from one side surface to a generally central location thereof. Gas transfer passage 630 is connected with a second, vertically extending gas transfer passage 632 which runs from the central location in the upper tool to a central location in the exposed face of the upper tool. A pressure line 635 connects the gas transfer passage 630 with a source (not shown) of bonding gas under high pressure, and appropriate valve means for initiating and stopping the flow of gas to the gas transfer passage 630 for a purpose described in detail below.

When the retort assembly 400 (as depicted in FIG. 2A) is positioned in an appropriate location on the lower tool of the press assembly, the upper and lower tools are moved relative to one another so that the spacing between the two tools is decreased. Preferably, the press assembly is fabricated such that the upper tool moves relative to the lower tool (i.e., where the lower tool is supported in a fixed position and the upper tool is movable relative to the lower tool). As the upper tool moves downwardly toward the lower tool, the exposed face of the upper tool engages the top surface 556 of the metal strips of which the seal frame is composed. The upper tool is caused to move into engagement with the top surfaces of the seal frame 500 with sufficient downward pressure to create a sealed volume "V" defined between the upper surface of the retort top sheet 402, the inner sides 552 of the seal frame, and the lower exposed surface of the upper tool. Throughout the process, pump 432 is maintaining a vacuum within the retort 400. A heated environment is created about retort 400 while the retort is secured in the press assembly 600. As the retort is heated to a temperature within the range of approximately 1700° F. to 1900° F., gas is pumped through line 635 into the volume "V" so as to create enormous pressure within the volume "V" and thereby cause various surfaces of the metal sheets in stack 40 to be pressed together and thereby experience diffusion bonding. After maintaining this high pressure and high heat environment for a predetermined period of time (of sufficient duration to accomplish diffusion bonding), the gas pressure is released, the temperature environment about the press assembly is cooled, the press assembly is opened and the retort is cooled to a sufficiently low enough temperature to permit removal of the top and bottom sheets of stainless steel, of which the retort has been fabricated, from about the now-bonded stack of metal sheets.

Figure 3B:
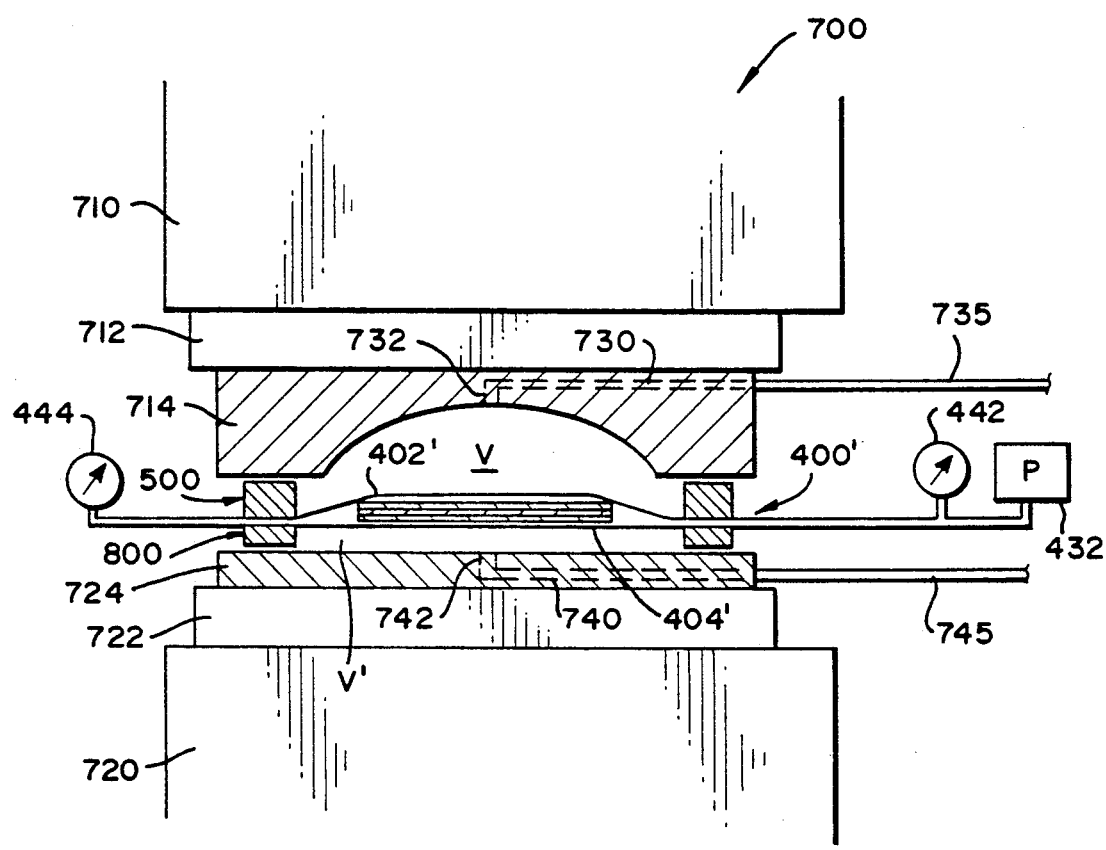
FIG. 3B is a cross-sectional view of a second tool assembly used to effect both diffusion bonding and superplastic preforming as contemplated by the present invention, with the sealed retort being disposed between upper and lower press assembly tools in advance of effecting the step of diffusion bonding.

A second forming apparatus 700 is shown in FIG. 3B by which the processes of diffusion bonding and superplastic preforming of the stack 40 of metal sheets may be accomplished. This apparatus includes an upper press member 710 and a lower press member 720. Mounted on the exposed face of the upper press member is a platen member 712, and an upper shaping tool 714 is mounted on the exposed face of the upper platen member. Likewise, a lower platen member 722 is mounted on the exposed face of the lower press member 720, and a lower tool 724 is mounted on the exposed face of the lower platen member.

As with the first forming apparatus, the upper and lower platens of this apparatus preferably are fabricated from ceramic materials, and the upper and lower tools are made from metals which possess excellent heat transfer characteristics. However, in contrast to the first forming apparatus 600 where the upper tool 614 is formed with a substantially planar exposed face, the upper shaping tool 714 of this forming apparatus is formed with a concave recess having generally spherical or cylindrical attributes.

A horizontally extending gas transfer passage 730 is provided in the upper shaping tool 714 running from one side surface to a generally central location thereof. Gas transfer passage 730 is connected with a second, vertically extending gas transfer passage 732 which runs from the central location in the upper shaping tool to a central location on the concave surface of the upper shaping tool. A pressure line 735 connects the gas transfer passage 730 of the upper tool with a source (not shown) of bonding gas under high pressure, and appropriate valve means for initiating and stopping the flow of gas to the gas transfer passage 730.

The lower shaping tool 724 also is provided with a horizontally extending gas transfer passage 740 running from one side surface of the lower shaping tool to a generally central location thereof. Gas transfer passage 740 is connected with a second, vertically extending gas transfer passage 742 which runs from the central location in the upper shaping tool to a central location on the substantially planar surface of the lower shaping tool. A pressure line 745 connects the gas transfer passage 740 of the lower tool with a source (not shown) of bonding gas under high pressure, and appropriate valve means for initiating and stopping the flow of gas to the gas transfer passage 740.

Use of the apparatus disclosed in FIG. 3B to effect diffusion bonding and superplastic preforming is similar in many ways to use of the apparatus shown in FIG. 3A. Initially, the retort assembly 400 shown in FIGS. 2A and 2B is modified by attaching a seal frame 800 on the downwardly facing surface of the bottom sheet 404. The seal frame 800 has a construction similar to the seal frame 500 and is provided for a function similar to that of seal frame 500. The modified retort assembly (identified in FIG. 3B with the numeral 400' for sake of distinguishing over the retort assembly of FIG. 3A) is then positioned in an appropriate location on the lower shaping tool 724 of the press assembly (see FIG. 3B). The upper and lower tools 714, 724 are then moved relative to one another so that the spacing between the two tools is decreased. Movement of the upper tool downwardly toward the lower tool causes the lowermost faces of the upper shaping tool to engage the top surface of the seal frame metal strips in a manner similar to that described in connection with operation of the apparatus shown in FIG. 3A. The lowermost faces of the upper shaping tool bear down on the top surfaces of the seal frame with sufficient pressure to move the modified retort assembly downwardly. This results in the creation of two sealed volumes "V" and "V'". The first of these volumes "V" is defined by the upper surface of the retort top sheet 402', the inner side surfaces of the seal frame 500, and the lower exposed arcuate surface of the upper shaping tool. The second of these volumes "V'" is defined by the lower surface of the retort bottom sheet 404', the inner side surfaces of the seal frame 800, and the upper exposed substantially planar surface of the lower tool.

Throughout this forming process, pump 432 is maintaining a vacuum within the retort 400'. A heated environment is created about retort 400' while the retort is secured in the press assembly 700. As the retort is heated to a temperature within the range of approximately 1700° F. to 1900° F., gas is pumped through line 735 into the volume "V" so as to create enormous pressure within the volume "V" and thereby cause various surfaces of the metal sheets in stack 40 to be pressed together and thereby experience diffusion bonding. After maintaining this high pressure and high heat environment for a predetermined period of time (of sufficient duration to accomplish diffusion bonding), the gas pressure in line 735 is cut off and instead rerouted through line 745. Now, delivery of the pressurized gas to the volume "V'", causes the diffusion bonded stack 40, while still in the evacuated retort 400' and still at the diffusion bonding temperature of between approximately 1700° F. and 1900° F., to deform upwardly and engage with the arcuate shaping surface of the upper shaping tool 714. In this manner, the stack 40 undergoes diffusion bonding as well as preforming, all in a single thermal cycle. Once this diffusion bonding/preforming process is completed, the gas pressure in the volume "V'" is released, the temperature environment about the press assembly 700 is cooled, the press assembly is opened and the retort is cooled to a sufficiently low enough temperature to permit removal of the top and bottom sheets of stainless steel, of which the retort has been fabricated, from about the now-diffusion bonded and superplastically preformed stack 40 of metal sheets.

With reference now to FIG. 4, there is illustrated a preferred apparatus 42 for effecting superplastic forming after the process of diffusion bonding, or diffusion bonding coupled with superplastic preforming, has been accomplished. As shown, the preferred apparatus includes an upper tool 44 has preferably integral side walls 45 in the form of a ring which can be of any desired shape. A lower tool 46, which preferably has the same outer area dimension as upper frame 44, can be flat and act as a base as illustrated for supporting the stack of metal blanks 40. For purposes of the claims, both upper tool 44 and lower tool 46 are considered shaping members as both cooperate to form the desired shaped structure. The inner surface of upper tool 44 defines an inner chamber 48 and a female die surface. One or more male die members (not shown) can be provided in the chamber 48 to vary the shape of the part to be formed. The stack of metal blanks 40, which is supported on the lower tool 46, covers the chamber 48. The metal blanks of the stack must all be of a material suitable for joining such as by welding, brazing or diffusion bonding. At least one of the outer metal blanks, and most likely the inner blanks, must have an effective strain rate sensitivity for exhibiting the superplastic properties at a desired forming temperature and preferably within a temperature range required for diffusion bonding of the stack. This is shown in FIG. 5 by the expanded stack 40 where both sheets 12 and 14 have been superplastically expanded, while sheet 10 of the formed stack has been substantially unchanged. Initial thicknesses of the sheets of stack 40 are determined by the dimensions of the parts to be formed. The joining method to be used, namely diffusion bonding, depends on the material selected for the metal blanks, the temperature required for superplastic forming, and the desired strength. However, especially for titanium aluminide, diffusion bonding is preferred as this results in the strongest joining, in contrast to other conventional methods of joining such as welding or brazing. Furthermore, the bonding temperature is generally suitable for superplastic forming.

As previously mentioned, stop-off can be used at areas 30, 32, 34 to prevent bonding at those areas. The particular stop-off selected must prevent bonding and be compatible with the metal or metals of the stack (nonreactive with the stack metals and minimal diffusion into the stack metals). For titanium aluminide metal blanks, suitable stop-off materials are graphite, boron nitride and yttria. Typically, when using yttria stop-off, the stop-off pattern on the blanks is applied using a silkscreen process with a solution of yttria and a binder therefor. The binder holds the yttria in position during bonding and eventually vaporizes below the metal forming temperature.

Joining of the stack 40 at selected locations is normally accomplished outside of the forming apparatus 42 before the stack is placed therein. The weight of upper tool 44 acts as a clamping means for the stack 40. A single continuous edge of the stack 40 is effectively constrained between the upper tool 44 and the lower tool 46. This insures that the portions of the blanks of the stack to be formed will be stretched rather than drawn. Where desired, additional tightening means such as hydraulic jacks (not shown) can be employed to more effectively constrain the stack 40. Another additional tightening means that could be employed is a press (not shown), preferably hydraulic, having platens 50. Forming apparatus 42 is positioned between platens 50 and compressed thereby assuring that stack 40 is effectively constrained and chamber 48 sealed from the air. This arrangement is particularly advantageous as the platens 50 can be made of ceramic material and resistance heated wires 52 can be provided therein for heating stack 40 to the forming temperature. Other heating methods could be used with the forming apparatus 42 ordinarily surrounded by a heating means if the heating platens are not used.

Alternatively, an environmental control system could be provided for contamination prevention and diffusion bonding of the stack 40 when the latter is unjoined within the forming apparatus 42. The purpose of this system is to ensure that the stack 40 is exposed only to inert gas during heating, bonding and forming by fluid pressure. The metal blanks of stack 40 will not react with inert gas due to the nature of such gas, even at the elevated bonding and forming temperatures. Thus, in this environment, contamination of the stack will be minimized.

Line 52 is connected to a source of pressurized inert gas at one end (not shown) and to chamber 48 through orifice 54 in the upper tool 44. A valve 56 for governing the flow of inert gas through line 52 into chamber 48 and a pressure gauge 58 to indicate pressure are provided. The inert gas used is preferably argon in gaseous form. Line 52 also functions as an outlet for inert gas in chamber 48 and could also be connected to a source of vacuum, such as a suction pump (not shown) for creating vacuum in chamber 48. When line 52 is used as an outlet, valve 56 governs the flow of inert gas from the chamber 48. An additional line 60 is optimally provided on the opposite side of the tool 44. This line 60 is connected to the chamber 48 through orifice 62 in the upper tool 44 and functions as an outlet for inert gas in chamber 48. A valve 64 is provided in line 60 for regulation of inert gas flow from the chamber 48. Line 60 can simply function as a vent or be connected to a source of vacuum, such as a suction pump (not shown).

In the alternative method, the contamination prevention system can also function as a means for effecting gas pressure diffusion bonding of stack 40. Thus, when stack 40 is placed in forming apparatus 42 as shown in FIG. 2, the stack can be heated in an inert gas atmosphere to a suitable diffusion bonding temperature (approximately 1800° F. when the metal blanks of stack 40 are of alpha-2 titanium aluminide materials) by heat generated from heating platens 50, and then applying pressure to stack 40 by increasing the pressure in chamber 48 by adding additional pressurized inert gas through line 52 while maintaining line 60 closed via valve 64. In this manner, the untreated areas of stack 40 will be diffusion bonded by the application of such pressure, which is preferably approximately 900 psi for alpha-2 materials, for a suitable forming time (which depends on the thickness of the stack 40 and may vary from 30 minutes to 12 hours). The edges of the blanks of stack 40 may also be diffusion bonded if desired by virtue of sealing pressure thereon in the form of the weight of upper tooling 44 and optionally pressure from a press and/or a clamping means. After diffusion bonding stack 40, the excess inert gas would be removed from chamber 48 through lines 52 and 60 to allow for inflation of stack 40.

For expansion of stack 40 to the configuration shown in FIG. 5, expansion tubes 72 and 74 are provided (see FIGS. 1 and 6 for details). Expansion tube 72 (and likewise expansion tube 74 located on the opposite side of stack 40) is positioned between metal blanks 10 and 14, and protrudes into a channel 75 defined by the recesses 76 and 78 as well as that portion of surface 20 of metal blank 14 which overlies the recess 78. Recesses 77 and 79 are provided on the opposite sides of blanks 10 and 12, respectively, to provide a channel for inflation tube 74. The positioning of expansion tube 72 in such a channel prevents compression of tube 72 by the tools 44 and 46. Also, by locating tube 72 so that it protrudes only partially into the channel 75, inert gas will flow fairly evenly between the metal blanks of the stack 40, in this case on either side of the blank 12 as shown by arrows 80 and 82. As shown in FIG. 4, expansion tubes 72 and 74 have valves 84 and 86 therein, respectively, for governing flow of inert gas therethrough, and pressure gauges 88 and 90 for indicating pressure.

Expansion tubes 72 and 74 can also serve to draw off vaporized binder. To this end, tube 72 could act as an inlet and tube 74 an outlet with inert gas flow being transmitted through stack 40 prior to expansion of the stack to draw off the vaporized binder.

A pair of lateral grooves (only one groove 73 of the pair is shown in FIG. 6) are provided on opposite sides of the lower tool 46 with the one groove 73 being in alignment with recess 76 and the other groove (not shown) being positioned for alignment with recess 77. The lateral grooves are provided to insure that passage of inert gas from inflation tubes 72 and 74 between the metal blanks of the stack 40 is not prevented from reaching treated areas 30 and 34 by pinching of the stack due to the pressure exerted by the upper and lower tools 44 and 46. The width of the lateral grooves are preferably the same as the recesses 76 and 77, but the lateral grooves terminate further inward in the stack so that pinching does not occur before the inert gas flow reaches the treated areas 30 and 34.

As shown in FIG. 1, when treating as by stop-off selected areas of stack 40 to prevent diffusion bonding thereon, additional areas such as that shown at 92 and 94 should likewise be treated to prevent bonding thereon so that the gas from inflation tubes 72 and 74 will reach the selected treated areas for expansion of the stack 40. Apertures 96 are provided in the treated areas 30, 32, 34 for further transmitting the inert gas from inflation tubes 72 and 74 inside the stack to the other treated areas and to insure equal pressure inside the stack (in this case on either side of the metal blank 12). If pressure is unequal, the resulting core of the sandwich, metal blank 12 in the configuration illustrated in FIG. 5, would be distorted with a consequent effect on load-carrying ability on the final sandwich structure.

In order to make the expanded metallic sandwich structure as shown in FIG. 5 according to applicant's inventive method, metal blank workpieces 10, 12, 14 are provided. Both sheets 12 and 14 must be of a material having an effective strain rate sensitivity for superplastic forming. Optimally one or more of the blanks are treated at specified locations, such as at 30, 32, 34 so that when the metal blanks are arranged in a stack and diffusion bonded, only selected areas of the stack will be joined thereby. Alternately, the stack could be spot welded or brazed for selective joining. When joining by diffusion bonding, the use of the retort and vacuum is most desirable. However, use of the alternative method would necessitate placing the stack in the forming apparatus 42 before forming. The pressure in chamber 48 would be increased by flow of pressurized inert gas through line 52 into chamber 48. Once chamber 48 had an inert gas atmosphere, the stack would be heated by resistance wires 52 in heating platens 50 to a temperature which optimally would be suitable for both diffusion bonding and superplastic forming, although the temperature could later be raised or lowered if a different temperature is required for superplastic forming. The pressure in chamber 48 would be increased by additional pressurized inert gas through line 52 to a pressure suitable for diffusion bonding of stack 40. That pressure would be maintained for a time duration sufficient for diffusion bonding. When the metal blanks of the stack are of alpha-2, the temperature used would be approximately 1800° F. and the pressure about 800-900 psi. These values can, of course, be varied during forming and bonding as long as they are maintained within a suitable range, i.e., in which the values would be sufficient for diffusion bonding and/or superplastic forming. The time duration will vary depending upon the alloys used, temperature, pressure, and thickness of the stack 40. Duration may vary from 30 minutes to 15 hours, but three (3) hours is a fairly representative expectation. As previously stated, bonding temperature may vary from about 1750° F. to about 1900° F. Gas bonding pressure may vary from about 800 psi to 2000 psi or more with the preferred range being from about 800 to about 900 psi.

Before expanding the stack 40, the pressure in chamber 48 is reduced through lines 52 and 60. At superplastic forming temperature, which is about 1800° F. for alpha-2 titanium aluminide materials (generally 1750° F. to 1900° F.), the stack is expanded by flowing pressurized inert gas through lines 72 and 74 while optimally a vacuum is applied to chamber 48 through lines 52 and 60. The pressurized inert gas, which protects the interior of the stack from contamination at the elevated forming temperatures, flows from tubes 72 and 74 into channels 75 (preferably on opposite sides of the stack) whereupon the inert gas flows within the stack. Such pressurized inert gas within the stack forces the expansion of the stack due to the pressure differential between the interior of the stack and the chamber 48. The pressure differential normally used for superplastic forming of alpha-2 is normally in a range of from about 800 to 900 psi. Metal blank 14 is initially lifted by the pressure differential and pulls with it at the selected joined areas metal blank 12. Such expansion allows the pressurized inert gas to flow through apertures 96 to provide an equal pressure within the stack so that the core (workpiece 12) is formed uniformly. The equal pressure also retains metal blank 10 of the stack in its initial position, the latter being forced against the base or lower tool 46.

FIGS. 7 and 8 show a modified forming apparatus 130 and the use of a different technique for selective joining. The use of a two-sheet stack 132 with metal blanks 134 and 136 is also illustrated. Stack 132 could be joined as by diffusion bonding, brazing, or spot welding prior to the insertion in the forming apparatus 130. If diffusion bonded, the metal blanks 134, 136 would first be selectively treated with a suitable stop-off so that only certian predetermined areas of the stack would be joined.

Forming apparatus 130 utilizes an upper tool 140 having a lower arcuate surface defined by a plurality of protuberances 142 spaced from one another by intermediate recesses or chambers 144. Lower tool 150 has an upper arcuate surface 152 complimentary to that formed by the protuberances 142. Inflation tubes 160 and 162 are positioned between the two metal blanks 134 and 136. Blanks 134 and 136 (similar to recesses 76 and 77 in metal blank 10 described in connection with the embodiment of FIG. 1) are provided with aligned recesses (not shown) which define a cylindrical chamber (not shown) in which tubes 160 and 162 are located. Lines 164 and 166, similar to lines 52 and 60 shown in the FIG. 2 embodiment, provide an inert gas environment in chamber 144 and act as vents or connection to sources of vacuum for drawing out the inert gas from the chambers 144 for superplastically expanding metal blank 134 within those chambers. Each of the tubes 164 and 166 would be provided with a valve (not shown) and pressure gauge (not shown) to control addition and removal of inert gas in chambers 144. Tubes 164 and 166 are connected to bores 170 and 172, respectively, which provide access to chambers 144.

Depending on the thickness and desired curvature of stack 132, the stack can be preformed to such a shape prior to insertion in forming apparatus 130 by conventional sheet metal forming, such as by roll forming or superplastic forming, or subsequent to insertion in forming apparatus 130 by pressure applied to the stack by the protuberances 142 of upper tool 140 and surface 152 of lower tool 150. Preforming in the forming apparatus 130 is preferable as the preforming and selective diffusion bonding are accomplished simultaneously when the stack is also unjoined prior to insertion in the forming apparatus, thereby saving fabrication time and equipment costs.

Using this forming apparatus 130, the unjoined stack can be diffusion bonded by application of pressure from upper tool 140 and lower tool 150 at required temperature for a suitable time duration. By virtue of protuberances 142, the pressure is only applied to selected areas of the stack so that only those areas are diffusion bonded, thereby allowing for expansion in the unbonded areas.

After diffusion bonding (or insertion into the forming apparatus if the stack has already been joined) and preforming, stack 132 is inflated by flow of inert gas through lines 160 and 162 so that the unjoined areas of metal blank are expanded into the chambers 144. Optimally, a vacuum would be applied to chambers 144 through lines 164 and 166. As the only space provided for expansion is chambers 144, only metal blank 134 is expanded and consequently only that blank must be of a material suitable for superplastic forming. It is seen from the above that diffusion bonding, pre-forming, and superplastic expansion can all be done in the same apparatus in one operation.

FIG. 9 illustrates the forming of a variably shaped structure, the latter being shown as a tapered sandwich structure with an attachment joined thereto. Applicant accomplishes tapering of the sandwich structure by suitably designing the corresponding shaping surface of the upper tool. In FIG. 9, the upper tool 170 has an upper shaping surface 172 which angles downwardly from one side to the other (shown as left to right). Thus, when the upper metal blank 174 of stack 176 is superplastically expanded against surface 172, it is shaped into the taper of such surface. The core formed by blank member 178 of stack 176 is also tapered by virtue of its dependence upon the movement of upper blank 174.

Attachment 180, shown in an arbitrary design, is joined to the stack 176 on the upper member 174 along bond line 183 during the superplastic expansion of the stack in the same forming apparatus, thereby lowering fabrication time, apparatus cost, and forming difficulty. An attachment 180 could be positioned within a suitably shaped groove 182 where the attachment may or may not protrude from such groove, or be located in the forming chamber, without the use of a groove so that it forms either a male or female shaping surface itself. For purposes of the claims, when a groove is used, it is positioned within the chamber when in the groove. In the embodiment illustrated, when the stack is superplastically expanded, it contacts attachment 180 along bond line 183. By virtue of the superplastic forming temperature, the attachment is also heated, and the pressure expanding the stack eventually forces the upper member to bear against surface 172 and the attachment. The attachment is then diffusion bonded to the stack along bond line 183 when the temperature and pressure are maintained at a required diffusion bonding level for a suitable time duration. Optimally, the temperature and pressure for superplastic forming of members 174 and 178 would also be suitable for diffusion bonding so that the pressure or temperature would not have to be increased or decreased after forming in order to diffusion bond. The material selected for the attachment should be one that is suitable for diffusion bonding to the material of member 174, and preferably of a like material. As the superplastic forming gas pressure typically used is 900 psi, a pressure considerably less than the 2000 psi used normally in diffusion bonding, the bond which results may not develop full parent metal strength, but would likely be analogous to a high quality braze joint.

However, once the sandwich structure is fully expanded, as shown in FIG. 9, the pressure can be increased within the expanded sandwich through inflation tubes 190, 192 to a level more suitable for complete diffusion bonding.

A close-out such as shown at 194 can also be formed to the expanded sandwich structure in the same operation by diffusion bonding the close out, which comprises an unexpanded end of the stack 176, by heating the stack to the diffusion bonding temperature with application of pressure by upper and lower tools 170 and 171, respectively. The expanded sandwich structure 200 of FIG. 9 removed from the forming apparatus is shown at FIG. 10 with the side ends cut off.

Thus it is apparent that there has been provided, in accordance with the invention, a method for making metallic sandwich structures from a plurality of workpieces that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and scope of the appended claims.

What I claim as my invention is:

1. A method for forming metallic sandwich structures using titanium aluminide materials, comprising:
    forming a stack of sheet metal blanks of said titanium aluminide materials on which stop-off materials have been applied to preselected regions of one or more of said sheet metal blanks,
    sealing said stack within a retort,
    evacuating said retort to provide a contamination-free, pressurized environment in said retort,
    diffusion bonding selected areas of said stack at a first diffusion bonding temperature in said contamination-free environment,
    removing said retort,
    heating said diffusion bonded stack to a second superplastic forming temperature, and
    applying expanding pressure to the interior of said stack at said second temperature to superplastically form a desired sandwich structure.

2. The method of claim 1, wherein
    said step of diffusion bonding selected areas of said stack comprises urging the sheets of said stack together with a pressure of diffusion bonding magnitude.

3. The method of claim 2, wherein
    said urging step comprises pressing the sheets of said stack together without contacting said stack with a tool.

4. The method of claim 3, wherein
    said urging step comprises forming a sealed chamber about a portion of said retort containing said stack and pressurizing said chamber with a gas, whereby said diffusion bonding pressure is applied uniformly to said retort portion.

5. The method of claim 4, and further comprising the step of superplastically preforming said diffusion bonded stack at said first temperature.

6. The method of claim 5, wherein
    said step of superplastically preforming said diffusion bonded stack comprises locating a sealed chamber about a portion of said retort containing said diffusion bonded stack and pressurizing said chamber to drive said diffusion bonded stack into shaping contact with a shaping surface of said chamber.

7. The method of claim 2, wherein
    said urging step comprises forming a sealed chamber about a portion of said retort containing said stack and pressurizing said chamber with a gas, whereby said diffusion bonding pressure is applied uniformly to said retort portion.

8. The method of claim 2, and further comprising the step of superplastically preforming said diffusion bonded stack at said first temperature.

9. The method of claim 1, and further comprising the step of superplastically preforming said diffusion bonded stack at said first temperature.

10. The method of claim 1, wherein
    said step of superplastically preforming said diffusion bonded stack comprises locating a sealed chamber about a portion of said retort containing said diffusion bonded stack and pressurizing said chamber to drive said diffusion bonded stack into shaping contact with a shaping surface of said chamber.

11. The method of claim 1, wherein
    said first temperature is in the range of from about 1700° F. to about 1900° F., said second temperature is in the range of from about 1700° F. to about 1950° F., and said contamination-free environment is a vacuum.

12. A method of forming metallic sandwich structures using titanium aluminide material, comprising:
    sealing a stack of metal sheet of said titanium aluminide material in a retort and evacuating said retort to provide a contamination-free environment for said stack,
    diffusion bonding preselected regions of said sheets at a first diffusion bonding temperature by applying diffusion bonding pressure to one side of said retort, and
    superplastically preforming said diffusion bonded sheets at said first temperature by applying superplastic forming pressure to an opposite side of said retort.

13. The method of claim 12, and further comprising the step of superplastically forming said diffusion bonded and superplastically preformed stack of metal sheets at a second temperature by applying expanding pressure to the interior of said stack.

14. The method of claim 12,
    wherein said step of applying diffusion bonding pressure comprises forming a chamber over a portion of said retort overlying said stack, sealing said chamber, and delivering gas under high pressure into said chamber so that pressure is applied uniformly to said retort portion and regions of said stack to cause preselected parts of said stack to undergo diffusion bonding.

15. The method of claim 13,
    wherein said step of applying superplastic preforming pressure comprises forming a second chamber over another portion of said retort overlying said stack, sealing said chamber, and delivering gas under high pressure into said chamber so that pressure is applied uniformly to said another portion of said retort and to regions of said stack to cause preselected parts of said stack to undergo superplastic preforming.

16. Apparatus for diffusion bonding selected regions of a stack of titanium aluminide sheets, comprising:

a first tool and a second tool having respective shaping surfaces, means for containing said stack of sheets in a contamination-free environment, said containing means including on one exterior surface thereof a first sealing frame means adapted for sealing engagement with said first tool to define therewith a first volume, means for moving said first and second tools relative to one another so that as said second tool supports said containing means adjacent said second tool shaping surface, said first tool sealingly engages with said first sealing frame means to define therewith and with said one exterior surface of said containing means a first chamber, means for heating said first chamber and the elements defining said first chamber to a first temperature range within which diffusion bonding can take place, gas delivery means for delivering gas under pressure to said first chamber whereby said gas in said first chamber presses uniformly against said containing means exterior surface with a force sufficient to cause diffusion bonding between said selected regions of said sheets of said stack.

17. The apparatus of claim 16, and further including a second sealing frame means associated with another exterior surface of said containing means, said second sealing frame means being adapted for sealing engagement with said second tool to define therewith a second chamber when said first tool sealingly engages with said first sealing frame means on said one exterior surface of said containing means to define said first chamber, and gas delivery means for delivering said pressurized gas to said second chamber after said selected regions of said sheets of said stack have been diffusion bonded, whereby said gas in said second chamber presses uniformly against said another exterior surface of said containing means, while all said elements remain heated at said diffusion bonding temperature range, with a force sufficient to superplastically preform said diffusion bonded sheets of said stack by forcing said stack sheets toward and into shaping engagement with said shaping surface of said first tool.

18. The apparatus of claim 16, wherein said gas delivery means comprises a source of pressurized gas, and channel means in said first tool having one end communicating with said source of pressurized gas and another end communicating with said first chamber.

19. The apparatus of claim 17, wherein said gas delivery means comprises a source of pressurized gas, and channel means in said second tool having one end communicating with said source of pressurized gas and another end communicating with said second chamber.

20. The apparatus of claim 16, wherein said means for containing said stack of sheets in a contamination-free environment comprises means for maintaining a vacuum within the interior of said containing means, and said gas delivery means includes means for selectively redirecting the flow of pressurized gas between said first chamber and said second chamber.

* * * * *